(12) United States Patent
Aoki et al.

(10) Patent No.: US 7,600,435 B2
(45) Date of Patent: Oct. 13, 2009

(54) METHOD OF DETERMINING DETERIORATION OF PRESSURIZING PERFORMANCE OF SPOT WELDING GUN

(75) Inventors: Toshimichi Aoki, Yamanashi (JP); Hiromitsu Takahashi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/165,879

(22) Filed: Jul. 1, 2008

(65) Prior Publication Data

US 2009/0007693 A1   Jan. 8, 2009

(30) Foreign Application Priority Data

Jul. 3, 2007   (JP) .............................. 2007-175542

(51) Int. Cl.
*G01N 3/00*   (2006.01)

(52) U.S. Cl. ....................................... 73/850
(58) Field of Classification Search ..................... 73/850
See application file for complete search history.

(56) References Cited

U.S. PATENT DOCUMENTS

| | | | | |
|---|---|---|---|---|
| 5,637,241 | A * | 6/1997 | Moates | 219/109 |
| 6,118,095 | A * | 9/2000 | Nagano | 219/110 |
| 6,236,011 | B1 * | 5/2001 | Kato et al. | 219/86.41 |
| 6,274,840 | B1 * | 8/2001 | Kanjo | 219/86.41 |
| 6,377,869 | B1 * | 4/2002 | Watanabe et al. | 700/245 |
| 6,414,259 | B2 * | 7/2002 | Kanjo | 219/91.2 |
| 6,696,660 | B2 * | 2/2004 | Nastasi, Jr. | 219/109 |
| 6,888,089 | B2 * | 5/2005 | Okanda et al. | 219/86.41 |
| 6,941,826 | B2 * | 9/2005 | Mitani et al. | 73/865.8 |
| 7,371,990 | B2 * | 5/2008 | Nomizu et al. | 219/109 |
| 2001/0040439 | A1 * | 11/2001 | Kato et al. | 318/432 |
| 2002/0134762 | A1 * | 9/2002 | Okanda et al. | 219/86.51 |
| 2004/0144157 | A1 * | 7/2004 | Mitani et al. | 73/7 |
| 2008/0308533 | A1 * | 12/2008 | Takahashi et al. | 219/117.1 |
| 2009/0001056 | A1 * | 1/2009 | Takahashi et al. | 219/86.7 |

FOREIGN PATENT DOCUMENTS

JP   2007-29994   2/2007

* cited by examiner

*Primary Examiner*—Lisa M Caputo
*Assistant Examiner*—Freddie Kirkland, III
(74) *Attorney, Agent, or Firm*—Lowe Hauptman Ham & Berner LLP

(57) ABSTRACT

A method of determining deterioration of pressurizing performance of a spot welding, the method having: obtaining reference data that reflect a dynamic state of a servo motor in a case where a movable side electrode tip is operated normally and a wok piece is pressurized by a specified pressurizing force; performing data processing on the reference data to extract a reference characteristic value; obtaining diagnostic data that reflect a dynamic state of the servo motor in a case where a operational state of the movable side electrode tip changes and the work piece is no longer pressurized by a specified pressurizing force; performing data processing on the diagnostic data to extract a diagnostic characteristic value; and determining deterioration of pressurizing performance of the spot welding gun based on the reference characteristic value and the diagnostic characteristic value.

11 Claims, 11 Drawing Sheets

METHOD OF DETERMINING DETERIORATION OF PRESSURIZING PERFORMANCE OF SPOT WELDING GUN

CROSS REFERENCE TO RELATED APPLICATIONS

The present application claims the benefit of priority based on Japanese Patent Application No. 2007-175542, filed on Jul. 3, 2007, disclosure of which is incorporated herein in its entirety by reference.

BACKGROUND OF THE INVENTION

1. Field of the Invention

The present invention relates to a method of determining deterioration of pressurizing performance of a spot welding gun which sandwiches a work piece between a pair of electrode tips, that is, a movable side electrode tip and an opposition side electrode tip, and, while applying pressurizing force to the work piece, performs welding of the work piece.

2. Description of Related Art

In spot welding that uses a spot welding gun, welding is performed on a work piece while a specified pressurizing force is being applied to the work piece sandwiched between a pair of opposing electrode tips, that is, a movable side electrode tip and an opposition side electrode tip of the welding gun. The opposing separation of the pair of electrode tips is set to a predetermined amount by directly moving the movable side electrode tip relative to the fixed side electrode tip having been positioned at a prescribed position.

In general, the movable side electrode tip is controlled so as to be moved by the driving force of a servo motor in a direction of closing or opening the opposing separation between a pair of electrode tips at a specified speed to a predetermined position. The work piece is thereby subjected to a specified pressurizing force between the pair of electrode tips so that stable quality of welding is maintained.

When a spot welding system is to be set up anew (at the time of installation) or processing conditions for welding are to be altered, a parameter adjusting operation is performed in order to decide operating parameters of the mounted welding gun taking into account dynamical characteristics of the welding gun such as rigidity or friction. Next, a calibration adjusting operation is performed for calibration of a torque command provided to the servo motor that drives the spot welding gun and an actual pressing force produced at the distal end of the electrode tip by the torque command. These adjusting operations are preliminary operations to be performed before welding is carried out with the spot welding gun. Then, welding operation is performed repeatedly with the spot welding gun.

However, it is known that a driving mechanism comprising a servo motor or a reduction gear necessarily deteriorates due to secular change such as wear of a sliding mechanism. Thus, machine elements such as ball screws and bearings are subjected to secular change due to faults or wear after usage for a long term. If the secular change is large, for example, if the welding gun can no longer operate, even if the robot controller outputs torque command to the servo motor, the driving mechanism of the welding gun itself cannot be operated, so that deviation of the pulse encoder value from the torque command is produced, leading to output of an alarm from the robot controller. An operator can thus recognize the occurrence of an anomaly in the spot welding robot. On the other hand, if the magnitude of secular change is small, for example, when a slight wear or the like is produced in a sliding mechanism, the magnitude of torque used in actual pressing of the work piece may be decreased due to the increase of the wear in the mechanism, but does not give rise to output of an alarm. Thus, only the pressurizing force produced by the welding gun is decreased. In such a situation, it is necessary to perform diagnosis of the welding robot such as measurement of the pressurizing force in a predetermined timing, and to perform adjusting operation again for parameters and calibration in order to prevent the quality of welding from being lowered. However, since a pressure sensor used for measuring the pressurizing force is expensive, adequate number of sensors may not be provided, and then, welding may be performed without recognizing the change of pressurizing force, which may lead to degradation of welding quality.

Therefore, in order to avoid degradation of welding quality, a deterioration diagnostic method has been proposed for diagnosing deterioration of a drive mechanism for a spot welding gun which uses a servo motor as a driving source.

Various methods have been known for diagnosing deterioration of a drive mechanism, and an example of deterioration diagnosing method applied to a spot welding gun is disclosed in Japanese Patent Publication No. 2007-29994. In the invention disclosed in Japanese Patent publication No. 2007-29994, the pressurizing time from the start of driving the electrode (movable side electrode) until the work piece is sandwiched under a predetermined pressing force and the pressurizing position (pressurized position) of the electrode when the work piece is sandwiched under a predetermined pressing force, are obtained, and deterioration of the drive mechanism due to wear of the mechanism can be diagnosed by analyzing the obtained pressurizing time and pressurizing position using a method of statistical analysis.

However, with respect to obtaining pressurizing position as disclosed in Japanese Patent Publication No. 2007-29994, it is necessary that the wear of the distal end of the electrode tip has been accurately measured. Usually, the distal end of the electrode tip is deformed or worn for each welding, but the amount of wear of the distal end of the electrode tip is measured only once after several cycles of operation. Thus, the obtained pressurizing position of the electrode includes errors due to the wear of the distal end of the electrode tip, and the deterioration of the drive mechanism due to wear of the mechanism may not be diagnosed accurately. There is also a problem that, since the rise-up behavior of the pressurizing force is influenced by individual difference of the work pieces and teaching deviation, it is difficult to grasp the deterioration of the drive mechanism accurately.

SUMMARY OF THE INVENTION

It is an object of the present invention to provide a method of determining deterioration of pressurizing performance of a spot welding gun that permits the operational state of a spot welding gun having a movable side electrode tip to be detected more accurately without being influenced by the wear of electrode tips or individual difference of work pieces, and that can thereby diagnose the deterioration of a spot welding gun more accurately.

In order to attain the above object, in accordance with an aspect of the present invention, there is provided a method of determining deterioration of pressurizing performance of a spot welding gun which has a movable side electrode tip moved by driving force of a servo motor and a fixed side electrode tip in opposition to the movable side electrode tip and which carries out welding of a work piece under pressurized state between the movable side electrode tip and the fixed side electrode tip, the method comprising: obtaining reference data that reflect a dynamic state of the servo motor when the movable side electrode tip is moved in a straight line in a predetermined operational mode without bringing the movable side electrode tip into contact with the work piece in the case where the movable side electrode tip is operated normally and the work piece is pressurized with a specified pressurizing force; performing data processing on the reference data to extract a reference characteristic value to be referenced when determining deterioration of pressurizing performance of the spot welding gun; obtaining diagnostic data that reflect the dynamic state of the servo motor when the movable side electrode tip is moved in the operational mode without bringing the movable side electrode tip into contact with the work piece in the case where the operational state of the movable side electrode tip changes and the work piece is no longer pressurized with the same specified pressurizing force as in the case where the movable side electrode tip is operated normally; performing data processing on the diagnostic data to extract a diagnostic characteristic value to be provided in order to determine deterioration of pressurizing performance of the spot welding gun; and determining deterioration of pressurizing performance of the spot welding gun based on the reference characteristic value and the diagnostic characteristic value.

With the construction as described above, deterioration of pressurizing performance of a spot welding gun can be determined by extracting a reference characteristic value from reference data of a servo motor when the movable side electrode tip is operated normally and a work piece is pressurized at a predetermined pressurizing force, and by extracting a diagnostic characteristic value from diagnostic data of the servo motor when the operational state of the movable side electrode tip changes and the work piece is no longer pressurized at a predetermined pressurizing force, and by comparing the reference characteristic value with the diagnostic characteristic value. The reference data and the diagnostic data of a servo motor are data obtained without bringing the movable side electrode tip into contact with the work piece, and therefore, are not influenced by the wear of the electrode tip or individual difference of the work pieces, so that the operational state of the spot welding gun having the movable side electrode tip can be detected more precisely, and deterioration of the spot welding gun can be diagnosed more accurately.

In the method of determining deterioration of pressurizing performance of a spot welding gun as described above, it is also possible to take, as the operational mode, a stepwise velocity command mode in which the movable side electrode tip is moved in a continuous operation at stepwise different moving velocities, and to obtain the reference data and the diagnostic data at the different moving velocities, and to extract the reference characteristic value by data processing of individual reference data, or to extract the diagnostic characteristic value by data processing of individual diagnostic data. With such construction, reference data and diagnostic data can be efficiently obtained in a continuous operation of the movable side electrode tip, and deterioration can be diagnosed more accurately.

In the method of determining deterioration of pressurizing performance of a spot welding gun as described above, it is also possible to take, as the operational mode, an intermittent velocity command mode in which the movable side electrode tip is moved at different individual moving velocities, and to obtain the reference data and the diagnostic data at the different moving velocities, and to extract the reference characteristic value by data processing of individual reference data, or to extract the diagnostic characteristic value by data processing of individual diagnostic data. With such construction, reference data and diagnostic data can be obtained in a simple method, and deterioration can be diagnosed accurately.

In the method of determining deterioration of pressurizing performance of a spot welding gun as described above, it is also possible to take, as the reference data or the diagnostic data, data selected from the group consisting of an estimated torque value estimated based on the current value that is inputted to drive the servo motor and an actual moving velocity obtained from a pulse encoder of the servo motor, an error between the displacement command value given to the servo motor and detected position obtained from the servo motor, a torque command value gave to the servo motor, and a current command value gave to the servo motor. With such construction, the range of application of the method of determining deterioration of a spot welding gun can be expanded.

In the method of determining deterioration of pressurizing performance of a spot welding gun as described above, it is also possible to take, as the reference characteristic value or the diagnostic characteristic value, data selected from the group consisting of maximum value, minimum value, average value, deviation value that is a deviation from the average value, convergence value, convergence time for converging to the convergence value of the reference data or the diagnostic data measured when the moving velocity reaches a constant, and rate of change of said reference data or the diagnostic data. With such construction, the range of application of the method of determining deterioration of a spot welding gun can be expanded.

In the method of determining deterioration of pressurizing performance of a spot welding gun as described above, it is also possible to take, as the reference characteristic value or the diagnostic characteristic value, the reference data or diagnostic data measured at the start of the movement of the movable side electrode tip. By thus obtaining the diagnostic characteristic value at the start of the movement of the movable side electrode tip, the start condition of the movement of the movable side electrode tip, and the range of application of the method of determining the deterioration of a spot welding gun can be expanded.

In the method of determining the deterioration of pressurizing performance of a spot welding gun as described above, it is also possible to perform data processing on a plurality of the reference characteristic values and a plurality of the diagnostic characteristic values to determine maximum value, minimum value, average value, and deviation value, and to use data selected from the group consisting of the maximum value, the minimum value, the average value, and the deviation value as a secondary reference characteristic value and a secondary diagnostic characteristic value, respectively. By using the secondary reference characteristic value and secondary diagnostic characteristic value obtained from a plurality of reference characteristic values and a plurality of diagnostic characteristic values to diagnose deterioration of the spot welding gun, a dynamical state of the spot welding gun can be determined rationally, and deterioration can be diagnosed more accurately.

It is also possible to display the reference characteristic value or the diagnostic characteristic value on output means. By displaying the reference characteristic value or the diagnostic characteristic value, an operator can be made to recognize the state of the spot welding gun.

In the method of determining deterioration of pressurizing performance of a spot welding gun as described above, it is also possible to store the reference characteristic value and the diagnostic characteristic value, and by using statistical processing of the reference characteristic value and the diagnostic characteristic value recorded, to predict the diagnostic characteristic value for the next diagnosis. By thus predicting the diagnostic characteristic value for the next diagnosis, welding failure can be avoided in advance and reliability of welding quality can be improved.

In the method of determining deterioration of pressurizing performance of a spot welding gun as described above, it is also possible to calculate the difference value between the predicted diagnostic characteristic value for the next diagnosis and the stored diagnostic characteristic value, and to compare the difference value with a preset threshold to determine deterioration of the spot welding gun. By thus calculating the difference value between the predicted diagnostic characteristic value for the next diagnosis and the stored diagnostic characteristic value and comparing the difference value with a preset threshold, deterioration of pressurizing performance of the spot welding gun can be determined more accurately.

In the method of determining deterioration of pressurizing performance of a spot welding gun as described above, it is also possible to output an alarm for warning an anomaly of the spot welding gun to the outside if the pressurizing performance is determined to have deteriorated. By thus outputting an alarm for warning an anomaly of the spot welding gun to the outside, an operator who becomes aware of the alarm can stop the welding operation, and can prevent welding failure in advance.

BRIEF DESCRIPTION OF THE DRAWINGS

The above and other objects, features, and advantages of the present invention will become more apparent from the following description of preferred embodiments with reference to appended drawings, in which.

DETAILED DESCRIPTION

Figure 1:
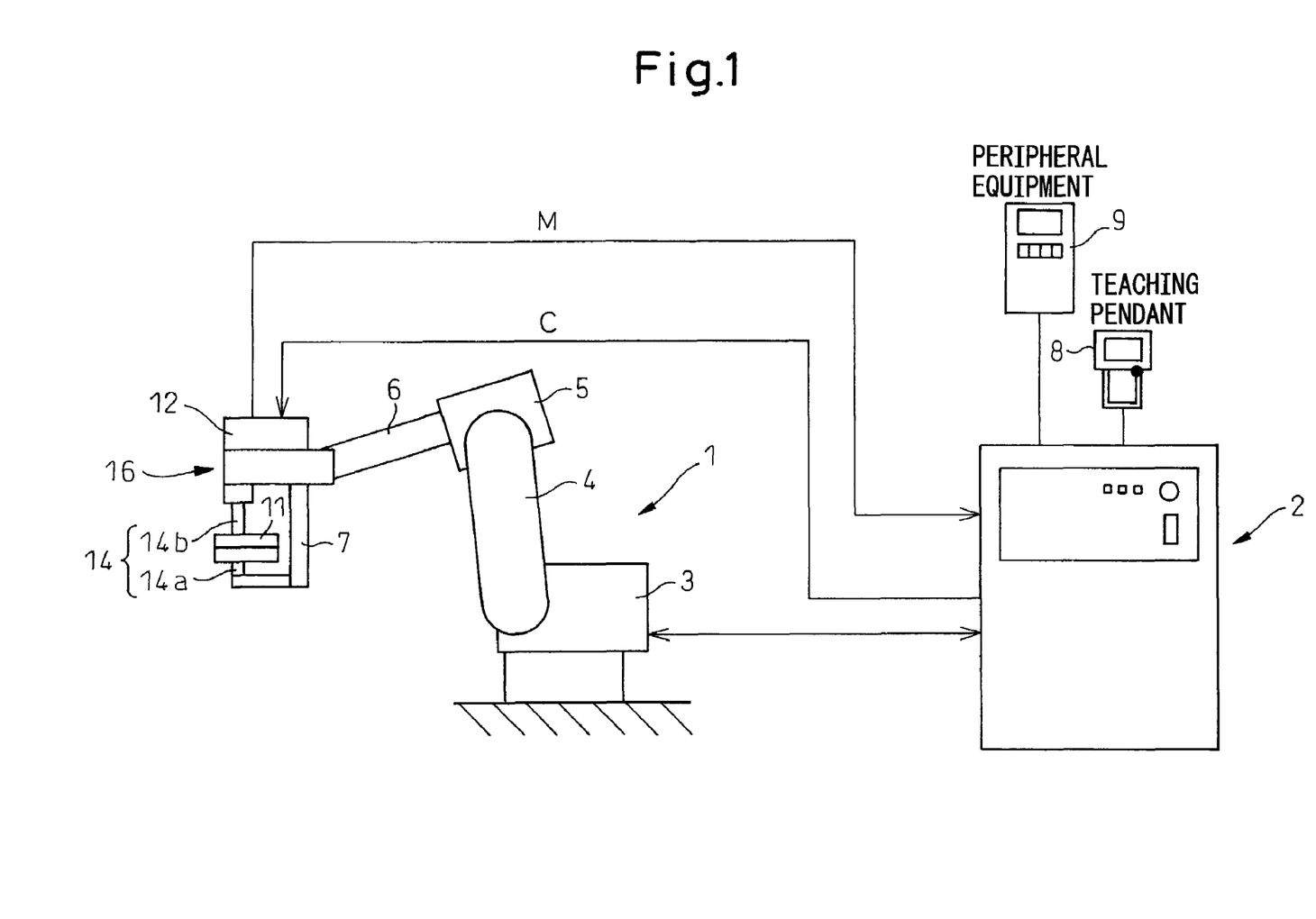
FIG. 1 is a front view of a robot system used in implementing a method of determining deterioration of pressurizing performance of a spot welding gun according to a first embodiment of the present invention.
Figure 2:
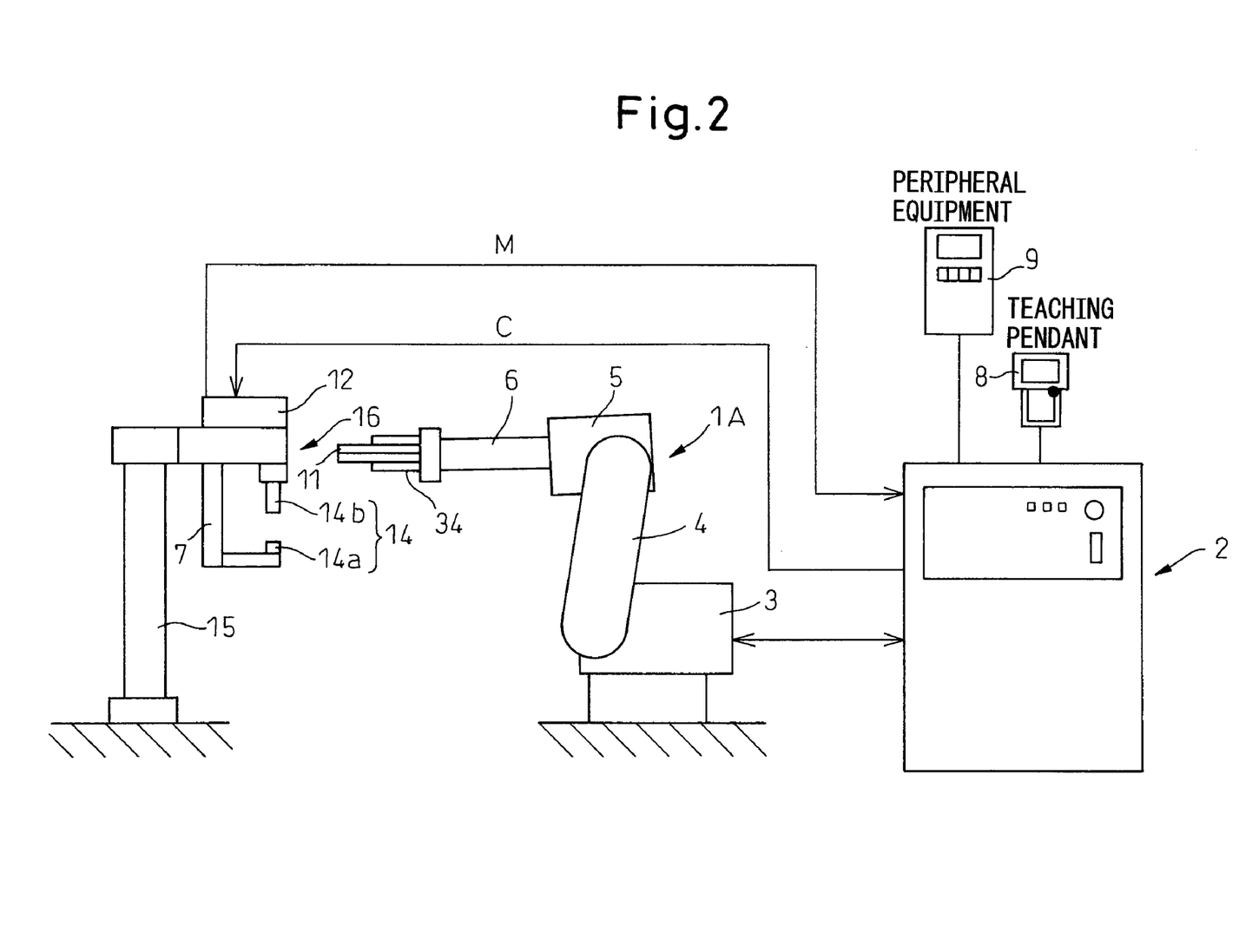
FIG. 2 is a front view of a robot system used in implementing a method of determining deterioration of pressurizing performance of a spot welding gun according to a second embodiment of the present invention.

The present invention will be described in detail with reference to drawings. FIG. 1 is a view of a robot system used in implementing a method of determining deterioration of pressurizing performance of a spot welding gun according to a first embodiment of the present invention. The robot system is not particularly limited, but is composed of a multi-joint type spot welding robot 1 having a spot welding gun 16, and a robot controller 2 for controlling the spot welding robot. FIG. 2 is a view of a robot system used in implementing a method of determining deterioration of pressurizing performance of a spot welding gun according to a second embodiment of the present invention. Spot welding gun 16 shown in FIG. 2 is provided separately from robot 1A, and is held on a distal end of a stem 15 on the floor. In FIG. 1 and FIG. 2, common constituents are denoted by same reference numerals, and duplicate explanation thereof is omitted.

As shown in FIG. 1, a spot welding robot 1 is a general 6-axes multi-joint type robot, comprising a base 3 fixed to the floor rotatably about a vertical first axis, an upper arm 4 connected to base 3, a forearm 5 connected to upper arm 4, a wrist element 6 rotatably connected to the distal end of forearm 5, and a spot welding gun 16 mounted to the end of wrist element 6. Upper arm 4 is attached to base 3 rotatably about a horizontal second axis. To the upper end of upper arm 4, the proximal end of forearm 5 is connected rotatably about a horizontal third axis. To the distal end of forearm 5, wrist element 6 is connected rotatably about a fourth axis parallel to the axis of forearm 5. To the distal end of wrist element 6, an unshown wrist element is connected rotatably about a fifth axis orthogonal to the axis of forearm 5. To the unshown wrist element, spot welding gun 16 is mounted rotatably about a sixth axis orthogonal to the fifth axis.

Spot welding gun 16 has an unshown linkage section rotatably connected to the wrist element, a gun arm 7 formed in the shape of inverted "C" integrally with the linkage section, and a sandwiching servo motor 12. Gun arm 7 has a fixed side electrode tip 14a, and a movable side electrode tip 14b which is opposed to fixed side electrode tip 14a and can move freely to come into contact with or away from fixed side electrode tip 14a. A pair of electrode tips 14a, 14b are bar-shaped and are disposed coaxially in the plate-thickness direction of a work piece 11.

Fixed side electrode tip 14a is adapted to have its position and attitude controlled by servo motor 12 driving various axes of robot 1. Thus, when fixed side electrode tip 14a is to be positioned to a taught position (position of spot welding point) in the plate-thickness direction of work piece 11, fixed side electrode tip 14a is driven by servo motor 12 that drives various axes of robot 1. On the other hand, movable side electrode tip 14b is driven by sandwiching servo motor 12 of spot welding gun 16 at a specified velocity to a predetermined position in a direction a pair of opposing electrode tips 14a, 14b.

Sandwiching servo motor 12 has an unshown power amplifier and an encoder mounted thereon. The current is amplified by the power amplifier and is supplied to servo motor 12. It is also possible to use a feedback control to obtain an estimated torque from the current value of servo motor 12 via an external disturbance observer 48 (see FIG. 3). The encoder is mounted in order to detect the rotation angle of servo motor 12 about its axis. With feedback control, the detected rotation angle is fed back, and movable side electrode tip 14b is positioned at a specified position so as to impart a predetermined pressurizing force to work piece 11 between a pair of electrode tips 14a, 14b. Although spot welding gun 1, 1A in the present embodiment and the second embodiment has no pressure sensor for detecting actual pressurizing force mounted thereon, it is also possible to provide a pressure sensor.

Robot controller 2 can drive one of the pair of electrode tips 14a, 14b, that is, movable side electrode tip 14a in opposing direction by means of servo motor 12 so as to control the pressurizing force on work piece 11 sandwiched between the pair of electrode tips 14a, 14b, and composes a digital servo circuit comprising an unshown CPU, various memories, and an I/O interface to perform position control, velocity control, torque (current) control and the like.

Operating program, teaching data, and the like for spot welding robot 1, 1A are stored in the memories as storage means. Teaching data include the data of spot welding point that indicate the position and attitude of spot welding robot 1, 1A, and spot welding gun 16 when spot welding is to be performed on multiple points of work piece 11. The position and attitude of spot welding robot. 1, 1A is not particularly limited, but in the present embodiment, spot welding gun 16 has a pair of electrode tips 14a, 14b arranged in a vertical direction.

Figure 3:
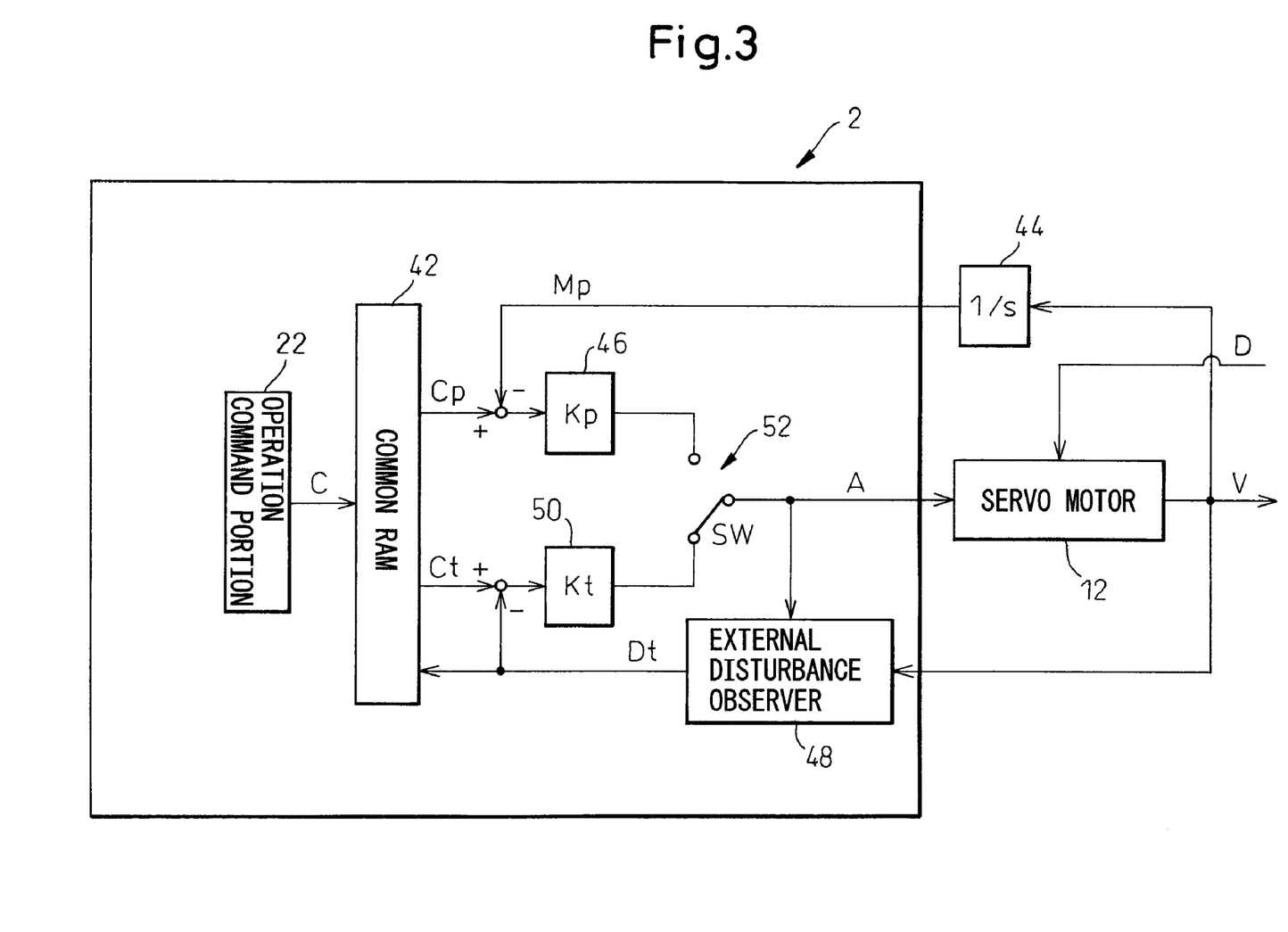
FIG. 3 is a block diagram of a robot controller shown in FIG. 1 and FIG. 2.

FIG. 3 is a block diagram showing a part of the construction of the robot controller. Servo motor 12 provided in spot welding gun 15 is controlled in position control based on position information fed back from a pulse encoder, position command and position control gain 46 delivered from an operating command portion 22 via a common RAM 42. Here, 1/s in the position feedback circuit means an integration operation, and s is a Laplace operator.

Servo motor 12 is controlled in torque control based on the estimated external torque disturbance estimated by an external disturbance observer 48, a position command value delivered from operation command portion 22 via common RAM 42, a torque command delivered from common RAM 42, and position control gain 46. The estimated external torque disturbance is a torque disturbance of servo motor 12 estimated from the motor control current and the actual motor speed using external torque disturbance observer 48. In the case of a spot welding gun 16, the external torque disturbance imposed on servo motor 12 corresponds to pressurizing force generated by pressing electrode tips 14a, 14b to each other and frictional force produced by the movement of movable side electrode tip 14a. In the description that follows, the estimated external torque disturbance estimated by observer 48 is used as the state variable representing dynamical characteristics of servo motor 12.

As shown in FIG. 1 and FIG. 2, a teaching pendant 8 which permits information in robot controller 2 to be read out or operation and setting of robot controller 2 to be performed, and a peripheral equipment 9 which communicates via a communication interface with robot controller 2 are connected to robot controller 2.

Figure 4:
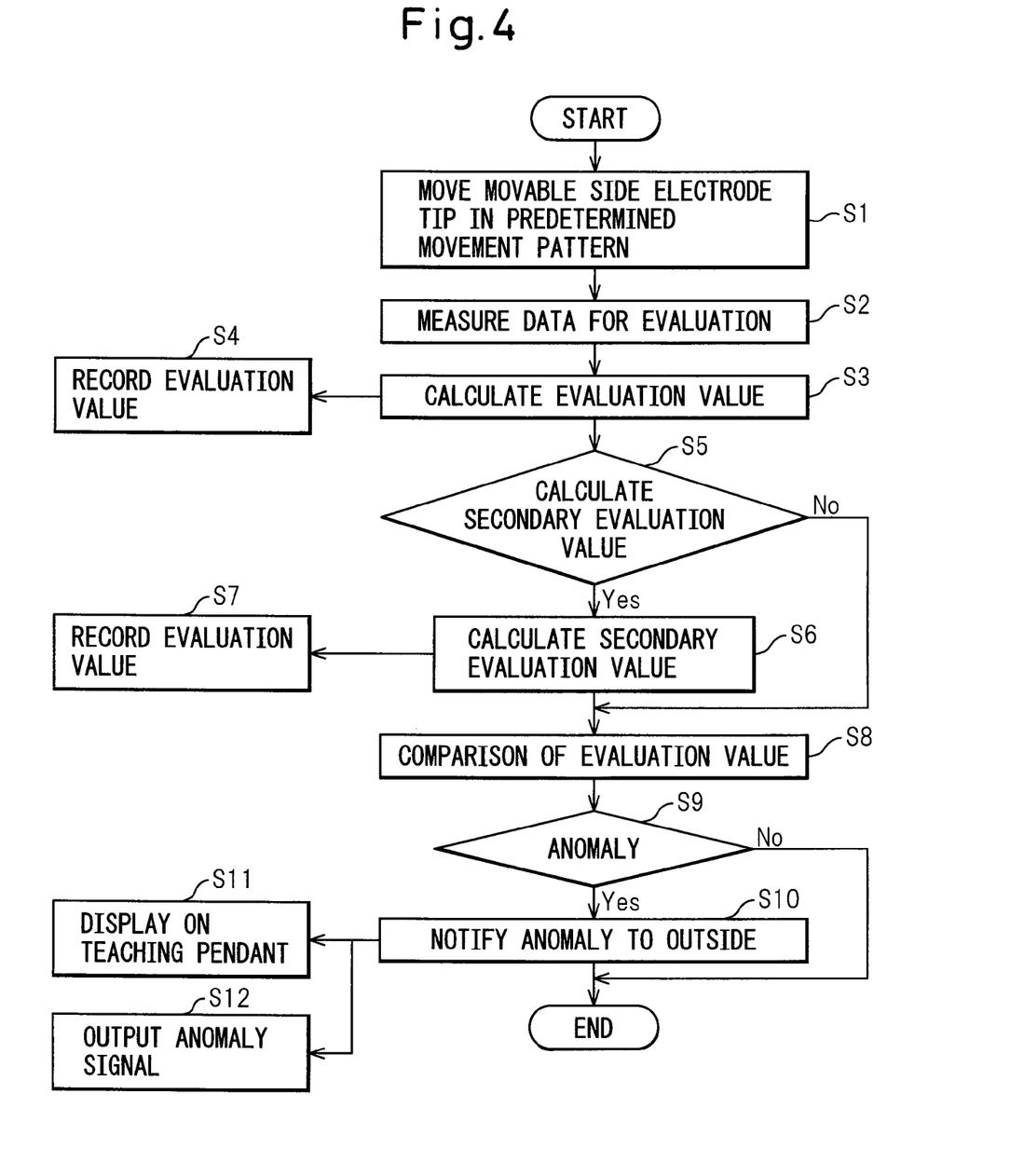
FIG. 4 is a flow chart explaining the method of determining deterioration of pressurizing performance of a spot welding gun.

FIG. 4 is a flow chart showing a method of determining deterioration of pressurizing performance of a spot welding gun 16. In FIG. 4, an evaluation value means a reference value (reference characteristic value).

First, at step S1, at a diagnosing time which can be selected arbitrarily by an operator, movable side electrode tip 14b is moved at a specified moving velocity pattern (operational mode) in closing or opening direction relative to fixed side electrode tip 14a.

Figure 5:
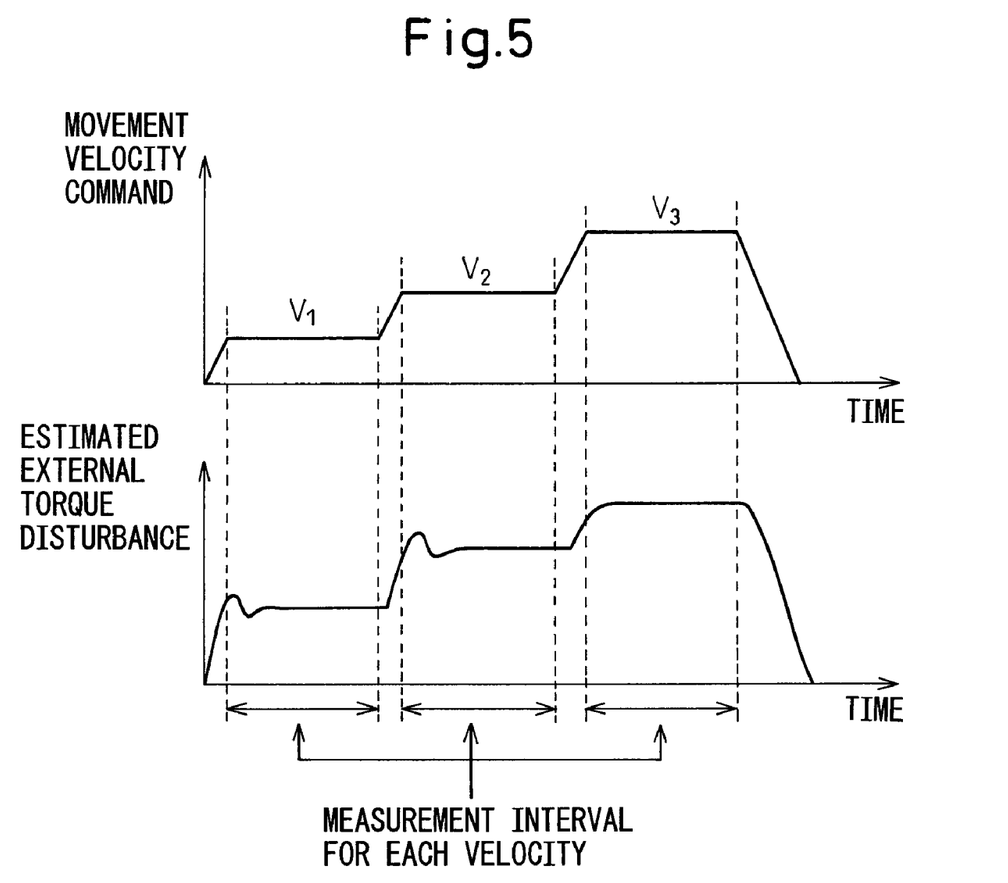
FIG. 5 is a view explaining an example of movement pattern of a movable side electrode tip.

Here, as an example of operational pattern, movement pattern as shown in FIG. 5 and FIGS. 6A-C may be used. The movement pattern shown in FIG. 5 is a stepwise pattern in which movable side electrode tip 14b is moved in a stepwise different moving velocity in one-time continuous operation, and closing or opening movement of movable side electrode tip 14b is performed at moving velocities of V1, V2, V3. At different moving velocities of V1, V2, V3, estimated torques corresponding to reference data or diagnostic data are obtained. An evaluation value as a reference characteristic value or a diagnostic characteristic value can be extracted by data processing of the estimated torque.

Figure 6A:
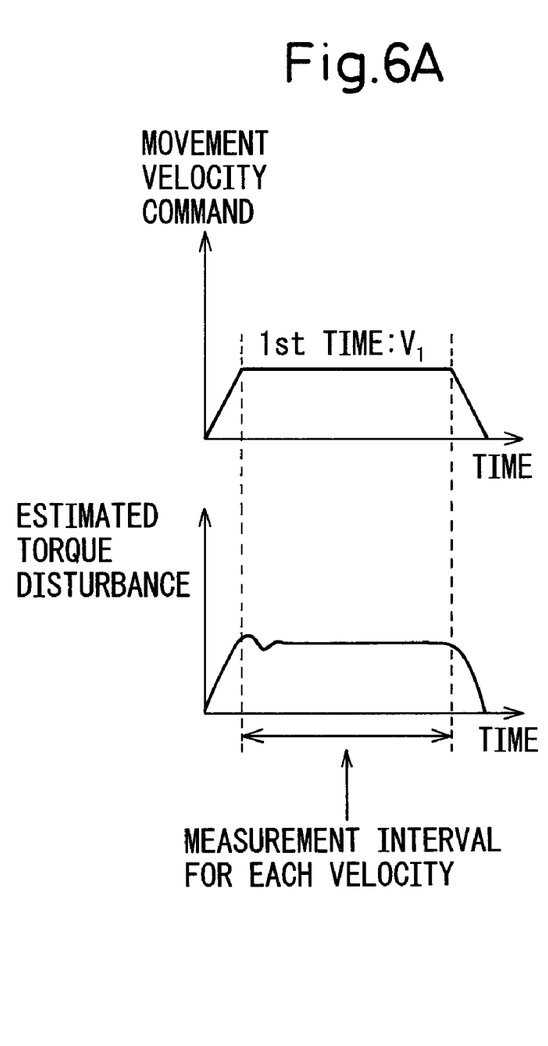
FIG. 6A is a view explaining the operation state of a servo motor at moving velocity of V1 in another example of movement pattern of a movable side electrode tip.
Figure 6B:
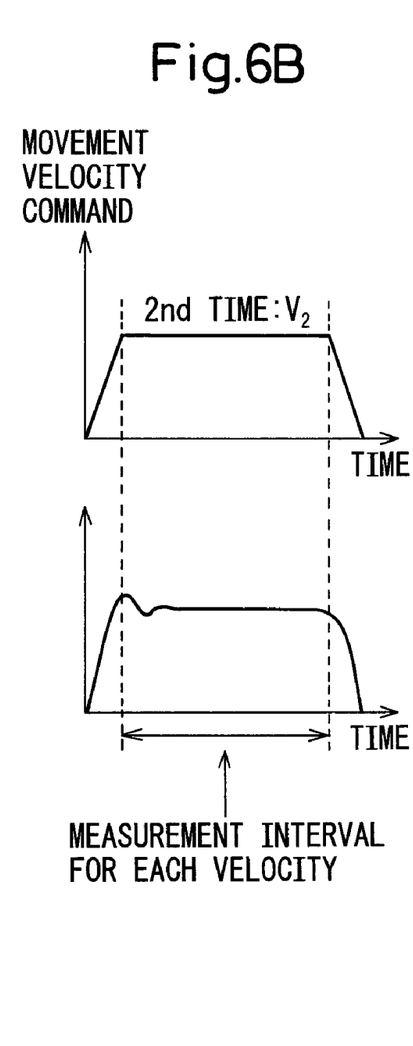
FIG. 6B is a view explaining the operation state of a servo motor at moving velocity of V2 in another example of movement pattern of a movable side electrode tip.
Figure 6C:
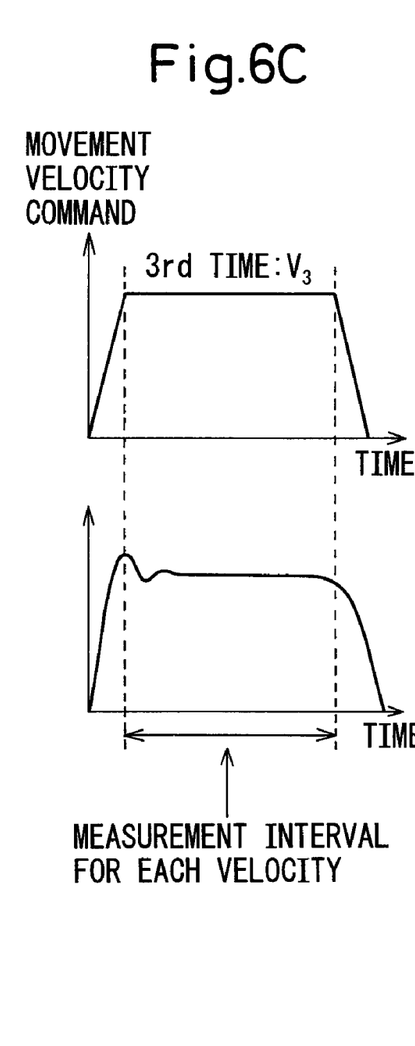
FIG. 6C is a view explaining the operation state of a servo motor at moving velocity of V3 in another example of movement pattern of a movable side electrode tip.

On the other hand, the movement patterns shown in FIGS. 6A-C are intermittent velocity command patterns in which movable side electrode tip 14b is moved at different individual moving velocities of V1, V2, V3, and closing or opening movement of movable side electrode tip 14b is performed at individual moving velocities of V1, V2, V3. FIG. 6A shows the operational state of servo motor 12 at moving velocity of V1, FIG. 6B shows the operational state of servo motor 12 at moving velocity of V2, and FIG. 6C shows the operational state of servo motor 12 at moving velocity of V3, respectively.

In FIG. 5 and FIGS. 6A-C, the measurement interval for which the reference characteristic value or diagnostic characteristic value is obtained is taken to be the interval for which, after a velocity command is outputted from robot controller 2 to servo motor 12, actual moving velocity of the servo motor is a constant velocity.

In FIG. 5 and FIGS. 6A-C, an estimated external torque disturbance is obtained as the reference data or diagnostic data reflecting the dynamical characteristics of servo motor 12. However, it is also possible to obtain an error between the displacement command value given to servo motor 12 and the actual movement value obtained from the pulse encoder provided on servo motor 12, the torque command value for servo motor 12, the current command value for servo motor 12, or the like.

Next, at step S3, an evaluation value is calculated, and at step S4, the evaluation value is recorded. With reference to the movement pattern shown in FIG. 5, maximum value $T_{max1}$ of the estimated external torque disturbance of servo motor 12 when the moving velocity command is a constant velocity V1 is obtained as an evaluation value. Similarly, maximum values $T_{max2}$, $T_{max3}$ of the estimated external torque disturbance of servo motor 12 for constant velocities V2, V3 are obtained as evaluation values. Also, average value $T_{avg1}$ of the estimated external torque disturbance of servo motor 12 when the moving velocity command is a constant velocity V1 is obtained as an evaluation value. Similarly, average values $T_{avg2}$, $T_{avg3}$ of the estimated external torque disturbance of servo motor 12 for constant velocities V2, V3 are obtained as evaluation values. In addition, minimum value, deviation value, convergence value, converging time Δt, change of obtained data ΔT relative to converging time can be obtained as evaluation values. Calculated evaluation values are stored together with the date and time of the record in the memory of robot controller 2 such that an operator can use a teaching pendant 8 or the like to read the evaluation values freely.

Figure 7:
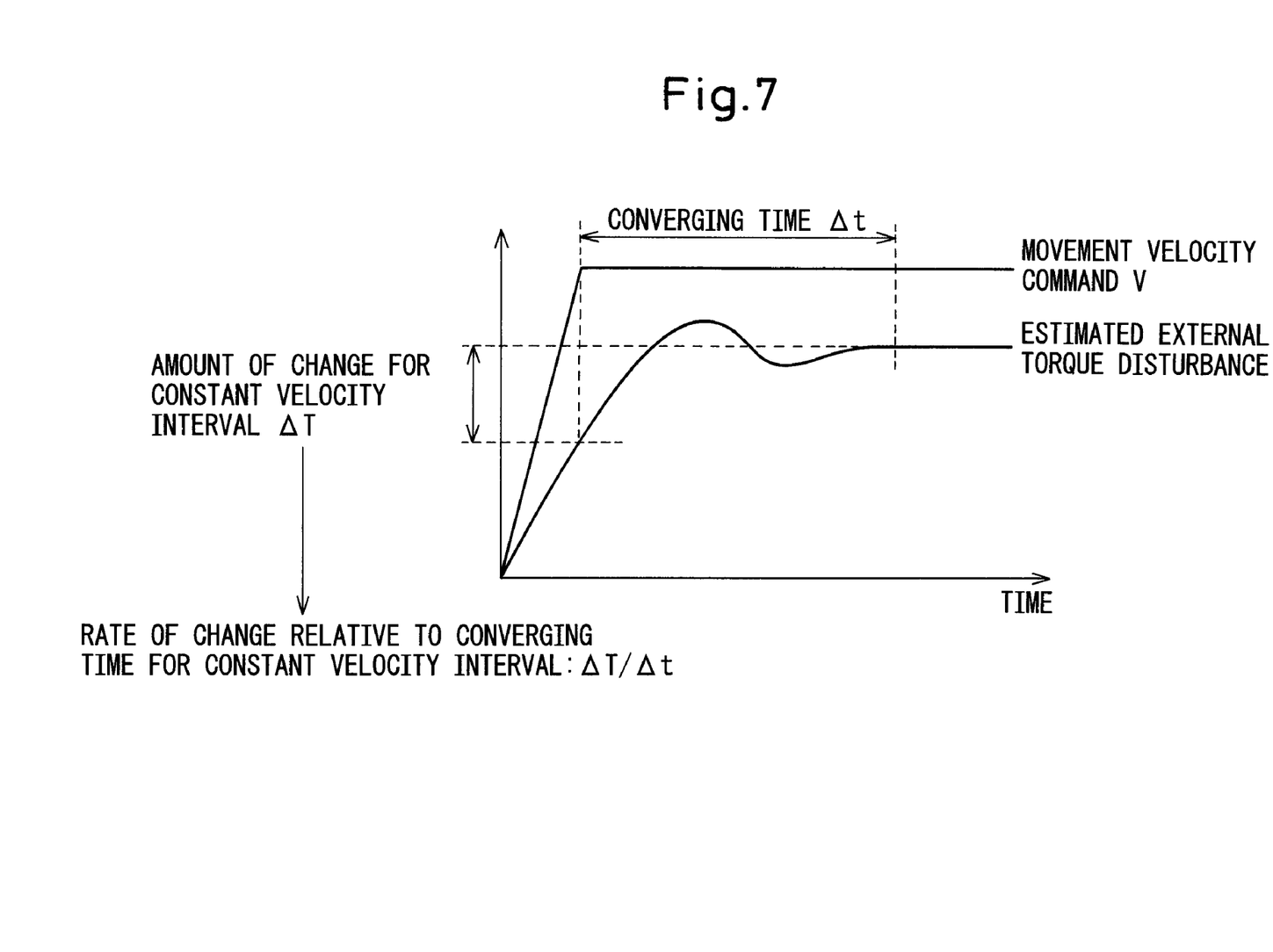
FIG. 7 is a view explaining a converging time as an evaluation value and an amount of change relative to the converging time.

As shown in FIG. 7, converging time Δt can be calculated as the difference of time from the time when the moving velocity command reaches to a constant velocity V until the estimated external torque disturbance of servo motor 12 converges to a constant value. Change of obtained data ΔT relative to converging time Δt can be calculated from converging time Δt and the difference of the estimated external torque disturbance when the moving velocity command reaches to a constant velocity V and the convergence value.

Figure 8:
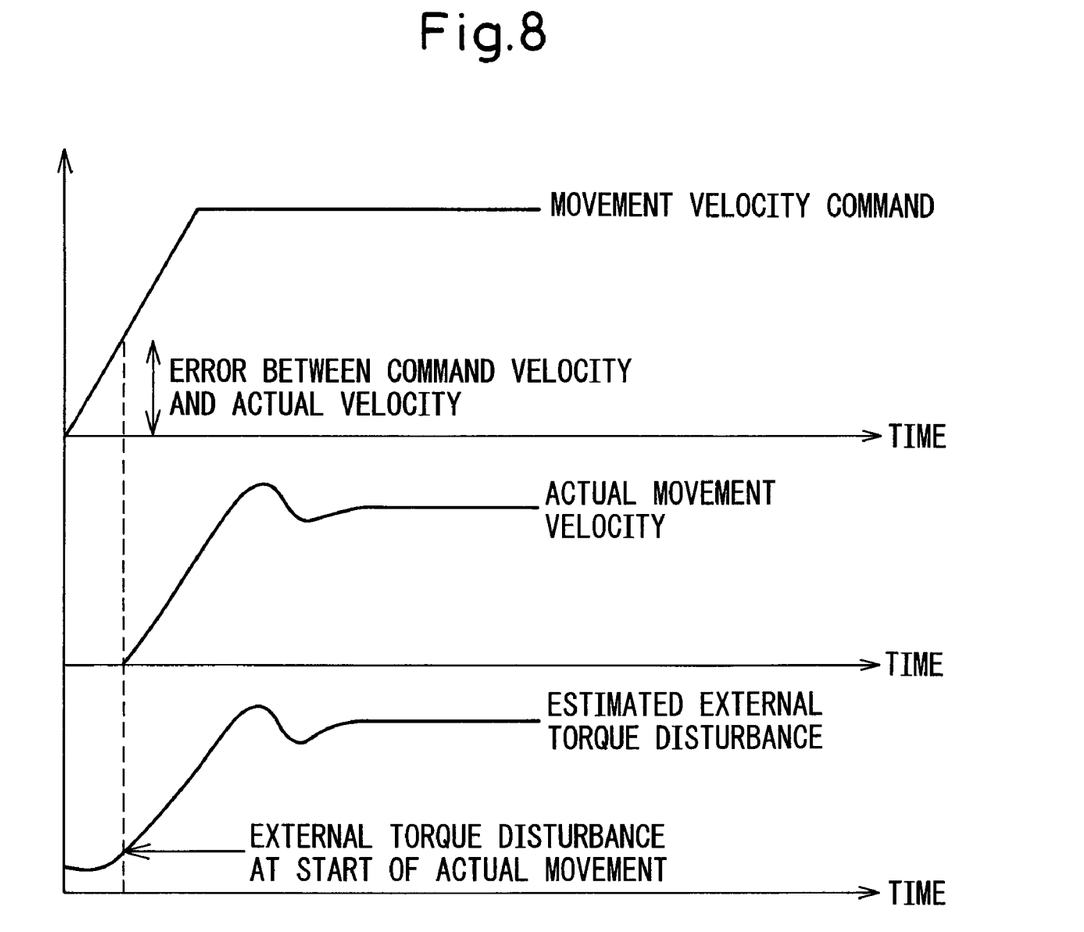
FIG. 8 is a view explaining the timing for obtaining reference characteristic value or diagnostic characteristic value when the movable side electrode tip starts movement.
Figure 9:
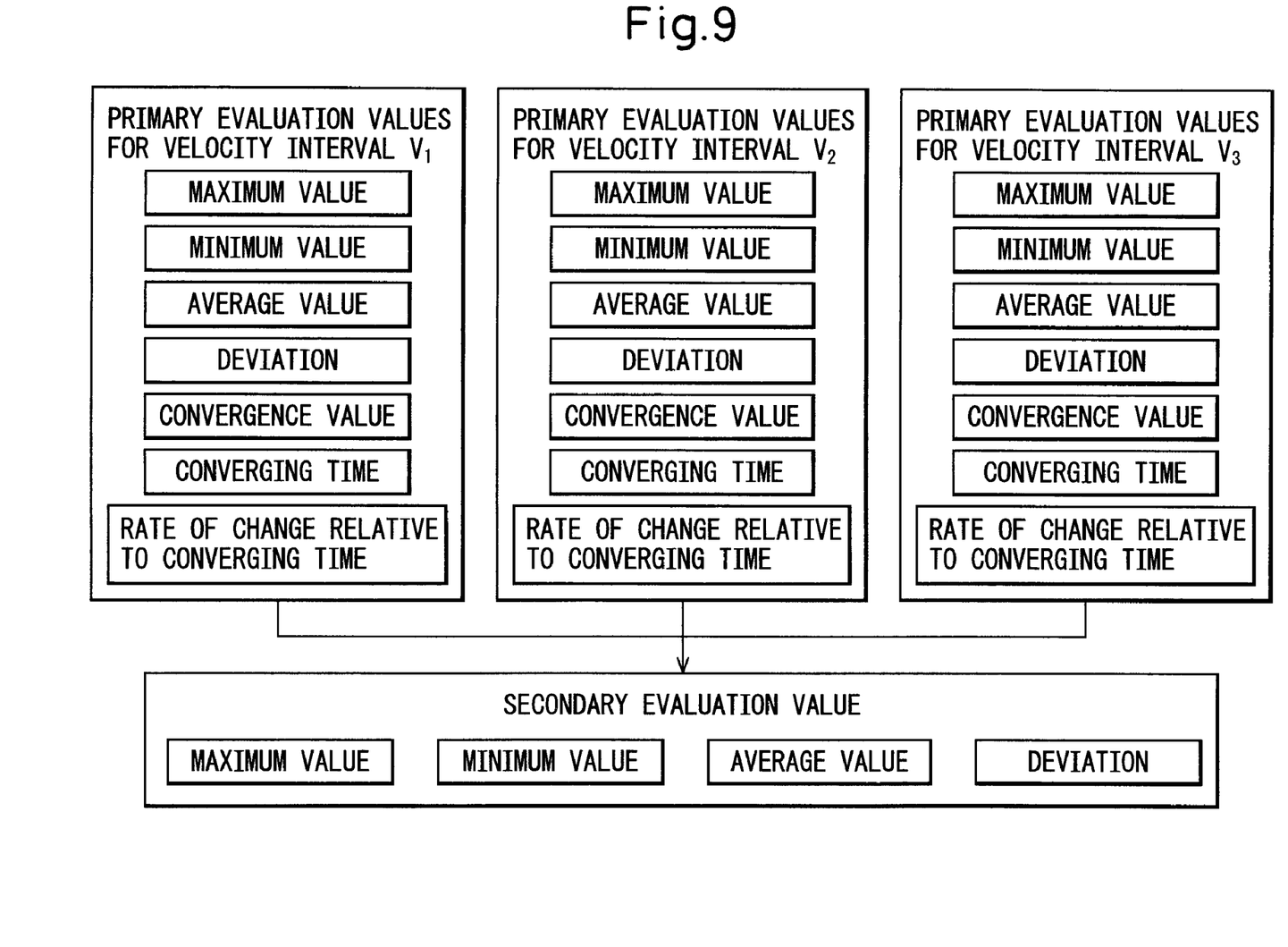
FIG. 9 is a view explaining the method of calculating secondary evaluation value.

FIG. 8 shows the timing for obtaining the reference characteristic value or the diagnostic characteristic value when the movable side electrode tip starts movement.

In FIG. 8, after the velocity command is outputted from the robot controller to servo motor 12, the external torque disturbance at the time of the start of movement of the movable side electrode tip can be obtained when the actual moving velocity of servo motor 12 reaches the value of 0 or higher. Although not shown, other values such as an error between the displacement command to servo motor 12 and the actual movement obtained from the pulse encoder provided in servo motor 12, the torque command value to servo motor 12, the current command value to servo motor 12, and the like can be obtained. The obtained reference characteristic values or diagnostic characteristic values are used as evaluation values. It is to be understood that the characteristic value at the start of movement of the movable side electrode tip and the characteristic value when the moving velocity of the movable side electrode tip is in a constant velocity interval can be obtained simultaneously by implementing one movement pattern.

Next, at step S5, it is determined whether or not secondary evaluation values corresponding to secondary reference characteristic values or diagnostic characteristic values should be calculated. In case of YES, the secondary evaluation values are calculated at step S6, and the calculated secondary evaluation values are recorded at step S7. In case of NO, the processing proceeds to step S8.

Here, the secondary evaluation values are calculated as shown in FIG. 8. Thus, based on the evaluation values calculated at step S3 for various velocities, maximum value, minimum value, average value, and deviation are calculated. As an example, if in one measurement, for movement patterns of V1, V2, V3, the maximum values of estimated external torque disturbance for respective velocities $T_{max1}$, $T_{max2}$, $T_{max3}$ are measured with the relation of $T_{max1} < T_{max2} < T_{max3}$, and if maximum value of the primary evaluation values is to be used as a secondary evaluation value, $T_{max3}$ is the secondary evaluation value. If the average value of the primary evaluation value is to be used as a secondary evaluation value, the secondary evaluation value is $(T_{max1}+T_{max2}+T_{max3})/3$. By calculating the secondary evaluation value in this way, measurement data can be evaluated comprehensively.

Next, at step S8, the evaluation value calculated from the estimated torque obtained when electrode tip 14a moves normally and work piece 11 is pressurized by a specified pressurizing force, is compared with the diagnostic evaluation value calculated from the estimated torque obtained when the operational state of the movable side electrode tip changes and work piece 11 is not pressurized by a specified pressurizing force. At step S9, it is determined whether or not there is an anomaly, and if there is an anomaly, at step S10, notification is given to the outside informing an anomaly. Then, at step S11, an anomaly is displayed on the teaching pendant. Or, at step S12, an alarm signal is outputted.

Figure 10A:
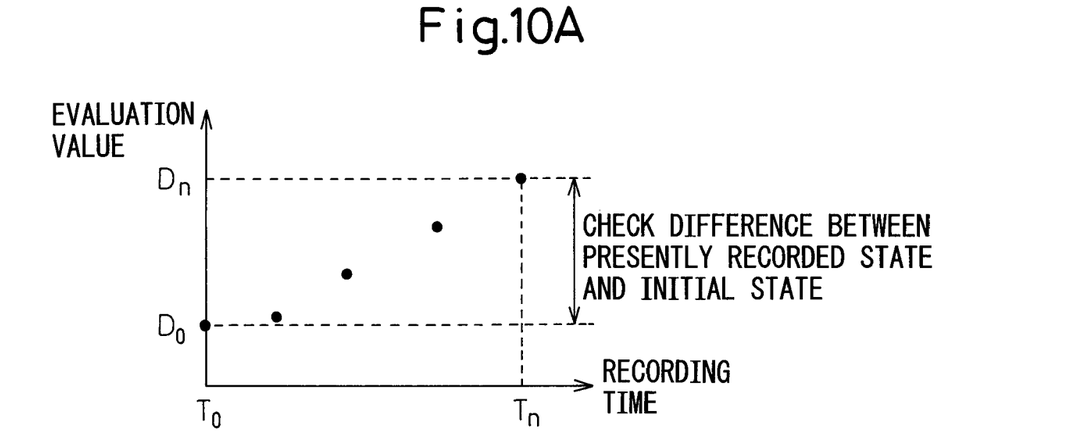
FIG. 10A is a view explaining an example of comparison of the present evaluation value with a reference value in a method of predicting the evaluation value of a spot welding gun.

Next, a method of predicting an evaluation value of a spot welding gun will be described with reference to FIGS. 10A, B and FIGS. 11A–C. FIG. 10A is a view of a case in which the present evaluation value is compared with the reference value, and if the difference exceeds a threshold for an anomaly that can be set arbitrarily by an operator, it is determined that there is the anomaly. Specifically, when an evaluation value $D_0$ at time $T_0$ is compared with an evaluation value $D_n$ at time $T_n$ and a threshold $E_1$ for an anomaly has been set, if $|D_n - D_0| > E_1$, it is determined that there is the anomaly (n is an integer, and means the number of the measurement).

Figure 10B:
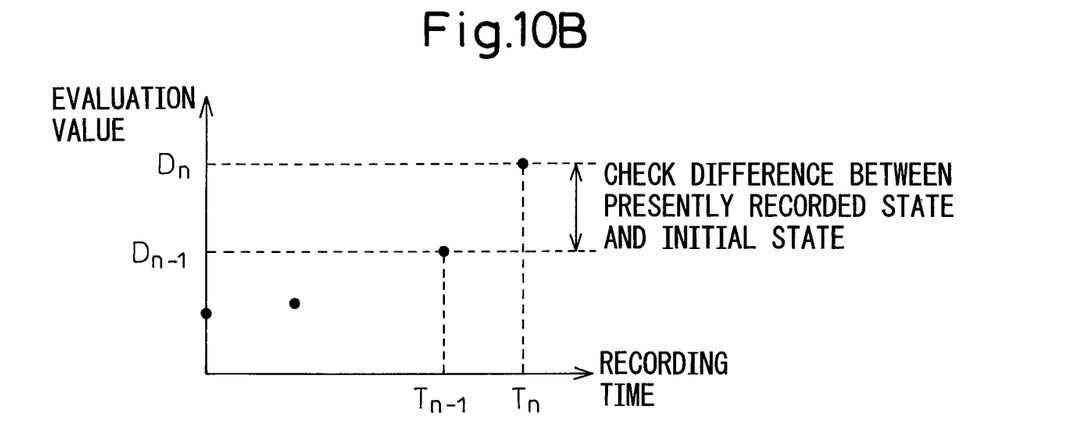
FIG. 10B is a view explaining an example of comparison of the difference between previous and present evaluation values with a threshold in the same method of predicting the evaluation value of a spot welding gun.

FIG. 10B is a view of a case in which the present evaluation value is compared with the previous evaluation value, and if the difference exceeds a threshold for an anomaly that can be set arbitrarily by an operator, it is determined that there is an anomaly. Specifically, when an evaluation value $D_{n-1}$ at time $T_{n-1}$ is compared with an evaluation value $D_n$ at time $T_n$ and a threshold $E_2$ for an anomaly has been set, if $|D_n - D_{n-1}| > E_2$, it is determined that there is an anomaly (n is an integer, and means the number of the measurement).

Figure 11A:
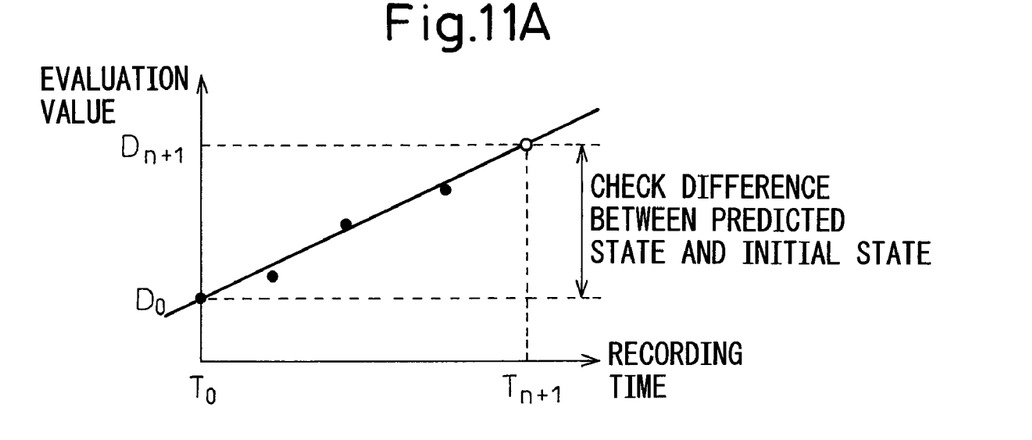
FIG. 11A is a view explaining an example of predicting an evaluation value from N-th order regression line in another method of predicting the evaluation value of a spot welding gun.

FIG. 11A is a view of a case in which N-th order regression line of evaluation value for the time sequence is calculated from the present record of obtained evaluation values, and an evaluation value to be obtained in the next measurement is predicted, and compared with the reference value, and if it exceeds a threshold for an anomaly that can be set arbitrarily by an operator, it is determined that there is an anomaly. Specifically, as shown in the following Figure, from the trend of all the evaluation values from evaluation value $D_0$ at time $T_0$ to evaluation value $D_n$ at time $T_n$, a linear regression line for the time sequence is calculated, and an evaluation value $D_{n+1}$ at time $T_{n+1}$ is determined from said regression line. Then, evaluation value $D_{n+1}$ at time $T_{n+1}$ is compared with evaluation value $D_n$ at time $T_n$, and if a threshold $E_3$ for an anomaly has been set, and if $|D_{n+1} - D_0| > E_3$, it is determined that there is an anomaly (n is an integer, and means the number of the measurement).

Figure 11B:
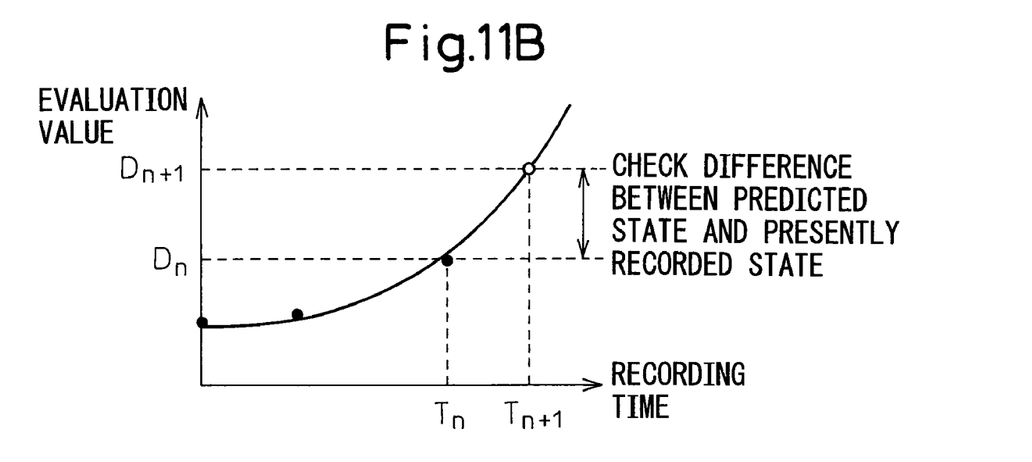
FIG. 11B is a view explaining an example of a comparison of the evaluation value predicted from N-th order regression line with the presently recorded evaluation value in the another method of predicting the evaluation value of a spot welding gun.

FIG. 11B is a view of a case in which N-th order regression line of evaluation value for the time sequence is calculated from the present record of obtained evaluation values, and an evaluation value to be obtained in the next measurement is predicted, and compared with the presently recorded evaluation value, and if it exceeds a threshold for an anomaly that can be set arbitrarily by an operator, it is determined that there is an anomaly. Specifically, as shown in the following Figure, from the trend of all the evaluation values from evaluation value $D_0$ at time $T_0$ to evaluation value $D_n$ at time $T_n$, a second-order regression line for the time sequence is calculated, and evaluation value $D_{n+1}$ at time $T_{n+1}$ is determined. Then, evaluation value $D_{n+1}$ at time $T_{n+1}$ from said regression line is compared with evaluation value $D_n$ at time $T_n$, and if a threshold $E_4$ for an anomaly has been set, and if $|D_{n+1} - D_0| > E_4$, it is determined that there is an anomaly (n is an integer, and means the number of the measurement).

Figure 11C:
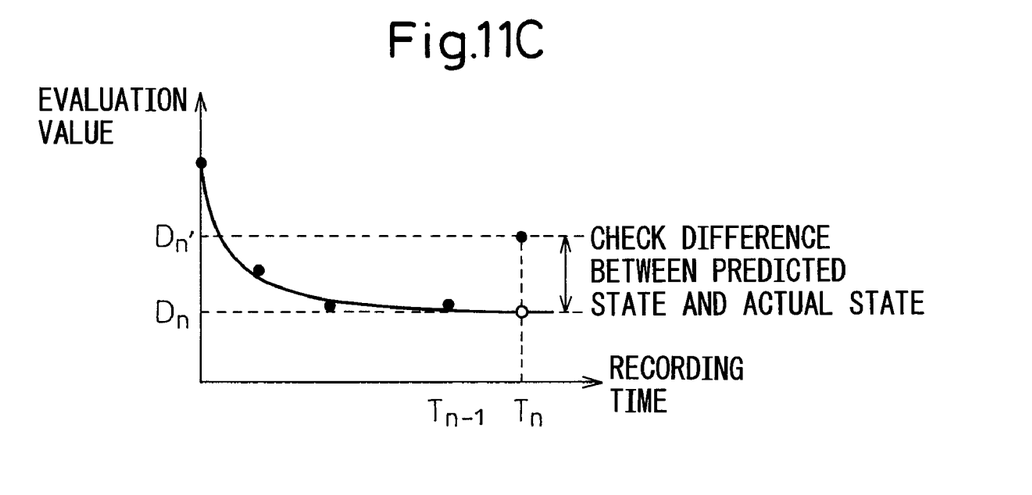
FIG. 11C is a view explaining an example of comparison of the predicted evaluation value with the actual evaluation value actually recorded at the predicted time when the evaluation value for the next measurement is predicted from exponential approximation line of evaluation value in the another method of predicting the evaluation value of a spot welding gun.

FIG. 11C is a view of a case in which an exponential approximation line for the time sequence is calculated from the present record of obtained evaluation values, and an evaluation value to be obtained in the next measurement is predicted, and compared with the actual evaluation value recorded at the predicted time, and if it exceeds a threshold for an anomaly that can be set arbitrarily by an operator, it is determined that there is an anomaly. Specifically, as shown in the following Figure, from the trend of all the evaluation values from evaluation value $D_0$ at time $T_0$ to evaluation value $D_{n-1}$ at time $T_{n-1}$, an exponential approximation regression line for the time sequence is calculated, and the evaluation value at time $T_n$ predicted from said regression line is determined. Let an evaluation value actually recorded at time $T_n$ be $D_n'$, and if a threshold $E_5$ for an anomaly has been set, and if $|D_n-D_n'|>E_5$, it is determined that there is an anomaly (n is an integer, and means the number of the measurement).

With the construction as described above, an operator can determine the timing of maintenance for a spot welding gun 16, and thus can always use welding gun 16 in a suitable state of performance for production, and can contribute improvement of welding quality. Failure can be found early and preventive measures can be taken and sudden occurrence of trouble can be avoided.

The present invention is by no means limited to above-described embodiments, but can be implemented in various modifications without departing from the scope and spirit of the present invention.

The invention claimed is:

1. A method of determining deterioration of pressurizing performance of a spot welding gun which has a movable side electrode tip moved by driving force of a servo motor and a fixed side electrode tip in opposition to said movable side electrode tip and which carries out welding of a work piece under pressurized state between said movable side electrode tip and said fixed side electrode tip, said method comprising:
   obtaining reference data that reflect a dynamic state of said servo motor when said movable side electrode tip is moved in a straight line in a predetermined operational mode without bringing said movable side electrode tip into contact with said work piece in the case where said movable side electrode tip is operated normally and said work piece is pressurized by a specified pressurizing force;
   performing data processing on said reference data to extract a reference characteristic value to be referenced when determining deterioration of pressurizing performance of said spot welding gun;
   obtaining diagnostic data that reflect a dynamic state of said servo motor when said movable side electrode tip is moved in said operational mode without bringing said movable side electrode tip into contact with said work piece in the case where a operational state of said movable side electrode tip changes and said work piece is no longer pressurized by said specified pressurizing force, in the same way as in the case where said movable side electrode tip is operated normally;
   performing data processing on said diagnostic data to extract a diagnostic characteristic value to be provided in order to determine deterioration of pressurizing performance of said spot welding gun; and,
   determining deterioration of pressurizing performance of said spot welding gun based on said reference characteristic value and said diagnostic characteristic value.

2. A method of determining deterioration of pressurizing performance of a spot welding gun according to claim 1,
   wherein said operational mode is a stepwise velocity command mode in which said movable side electrode tip is moved in a continuous operation at stepwise different moving velocities, and
   wherein said reference data or said diagnostic data are obtained at said different moving velocities, and
   wherein said reference characteristic value is extracted by data processing of individual reference data, or said diagnostic characteristic value is extracted by data processing of individual diagnostic data.

3. A method of determining deterioration of pressurizing performance of a spot welding gun according to claim 2,
   wherein data processing is performed on plurality of said reference characteristic values and a plurality of said diagnostic characteristic values to obtain a maximum value, a minimum value, an average value, and a deviation, and
   wherein data selected from a group consisting of said maximum value, said minimum value, said average value, and said deviation are used as secondary reference characteristic value and secondary diagnostic characteristic value for determining deterioration of pressurizing performance of said spot welding gun.

4. A method of determining deterioration of pressurizing performance of a spot welding gun according to claim 1,
   wherein said operational mode is an intermittent velocity command mode in which said movable side electrode tip is moved in different individual moving velocities, and
   wherein said reference data or said diagnostic data are obtained at said individual moving velocities, and
   wherein said reference characteristic value is extracted by data processing of individual reference data, or said diagnostic characteristic value is extracted by data processing of individual diagnostic data.

5. A method of determining deterioration of pressurizing performance of a spot welding gun according to claim 1,
   wherein said reference data or said diagnostic data are data selected from a group consisting of an estimated torque value estimated on the basis of said current value which is inputted to drive said servo motor and an actual moving velocity obtained from a pulse encoder of the servo motor, an error between said displacement command value given to said servo motor and a detected position obtained from said servo motor, a torque command value given to said servo motor, and a current command value given to said servo motor.

6. A method of determining deterioration of pressurizing performance of a spot welding gun according to claim 1,
   wherein said reference characteristic value and said diagnostic characteristic value are data selected from a group consisting of a maximum value, a minimum value, an average value, a deviation value that is a deviation from said average value, a convergence value, a convergence time for converging to said convergence value, and rate of change, of said reference data or said diagnostic data, measured when said moving velocity reaches a constant.

7. A method of determining deterioration of pressurizing performance of a spot welding gun according to claim 1,
   wherein said reference characteristic value and said diagnostic characteristic value are said reference data or said diagnostic data measured at a start of movement of said movable side electrode tip.

8. A method of determining deterioration of pressurizing performance of a spot welding gun according to claim 1,
   wherein said reference characteristic value or said diagnostic characteristic value is displayed on output means.

9. A method of determining deterioration of pressurizing performance of a spot welding gun according to claim 1,
   wherein said reference characteristic value and said diagnostic characteristic value are stored, and wherein a diagnostic characteristic value for next time diagnosis is predicted by performing statistical processing on said reference characteristic value and said diagnostic characteristic value recorded.

10. A method of determining deterioration of pressurizing performance of a spot welding gun according to claim 9,
wherein a difference value between said diagnostic characteristic value predicted for next time diagnosis and said stored diagnostic characteristic value is calculated, and
wherein said difference value is compared with a preset threshold for determining deterioration of pressurizing performance of said spot welding gun.

11. A method of determining deterioration of pressurizing performance of a spot welding gun according to claim 1,
wherein a warning is outputted to outside to inform an anomaly of said spot welding gun when it is determined that pressurizing performance of said spot welding gun has deteriorated.

\* \* \* \* \*